(12) United States Patent
Liu

(10) Patent No.: US 6,353,356 B1
(45) Date of Patent: Mar. 5, 2002

(54) HIGH VOLTAGE CHARGE PUMP CIRCUITS

(75) Inventor: Tz-yi Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/385,194

(22) Filed: Aug. 30, 1999

(51) Int. Cl.[7] .............................. G05F 1/10; G05F 3/02
(52) U.S. Cl. ...................................... 327/536; 327/534
(58) Field of Search ................................ 327/534, 535, 327/536, 537

(56) References Cited

U.S. PATENT DOCUMENTS

| | | | |
|---|---|---|---|
| 5,677,645 A | | 10/1997 | Merrit ........................ 327/536 |
| 5,982,223 A | * | 11/1999 | Park et al. ................... 327/536 |
| 6,046,626 A | * | 4/2000 | Saeki et al. .................. 327/536 |
| 6,075,402 A | * | 6/2000 | Ghilardelli et al. ......... 327/536 |
| 6,130,574 A | * | 10/2000 | Bloch et al. ................. 327/536 |
| 6,147,519 A | * | 11/2000 | Krymski ...................... 327/65 |

OTHER PUBLICATIONS

"Latchup", *CMOS Processing Technology*, 156.

Favrat, P., et al., "A High–Efficiency CMOS Voltage Doubler", *IEEE Journal of Solid–State Circuits*, 33, 410–416, (Mar. 1998).

Kawahura, T., et al., "Bit–Line Clamped Sensing Multiplex and Accurate High Voltage Generator for Quarter–Micron Flash Memories", *IEEE Journal of Solid–State Circuits*, 31, 1590–1598, (Nov. 1996).

* cited by examiner

*Primary Examiner*—Terry D. Cunningham
*Assistant Examiner*—Quan Tra
(74) *Attorney, Agent, or Firm*—Schwegman, Lundberg, Woessner & Kluth, P.A.

(57) ABSTRACT

Charge pump circuits are described to transfer a voltage signal in an output stage without signal level degradation. An exemplary circuit includes a transistor, complementary clock signals, and a gate controlling circuit to present a full range of voltage signal at the output stage without signal level degradation. An additional parasitic inhibitor circuit inhibits the appearance of parasitic effects associated with the operation of the transistor in the exemplary circuit.

24 Claims, 6 Drawing Sheets

HIGH VOLTAGE CHARGE PUMP CIRCUITS

FIELD OF THE INVENTION

The present invention relates generally to semiconductor integrated circuits. More particularly, it pertains to devices and methods to transfer a high voltage signal in an output stage of a charge pump circuit.

BACKGROUND OF THE INVENTION

Integrated circuits often require supply voltages of greater potential than that provided by an external voltage source. Memory circuits such as dynamic random access memories (DRAMs) and video DRAMs require higher internal voltages to pre-charge memory word lines and the like. Flash memories may require high voltages for operations, such as programming or erasing. Integrated circuits that are dependent upon a limited external power supply, such as a battery, must generate additional supply voltages using conversion circuitry. Charge pumps have been used as on-chip voltage generators capable of providing a voltage more positive than the most positive external supply or more negative than the most negative external supply.

Charge pump circuits comprise a number of conditioning stages. What has been frustrating in prior charge pump circuits is that the produced voltages at the output stage seem to degrade from the desired level. This degradation is made worse at the output stage because the substrate biasing of the output stage has an effect on the produced voltages.

Thus, what is needed are devices and methods to inhibit degradation in the output voltages in charge pump circuits.

SUMMARY OF THE INVENTION

The above mentioned problems with charge pump circuits and other problems are addressed by the present invention and will be understood by reading and studying the following specification. Devices and methods are described which accord these benefits.

An illustrative embodiment describes a charge pump circuit comprising a number of boosting stages to boost a voltage signal. The circuit also includes an output stage coupled to the boosting stages to output the voltage signal. A gate circuit is coupled to the output stage to control the output stage. And the circuit further includes a parasitic inhibitor circuit coupled to the output stage to inhibit at least one parasitic effect in the output stage.

In another illustrative embodiment a method is described to transfer power in an output stage of a charge pump circuit while inhibiting at least one parasitic effect of a transistor. The method includes receiving a high voltage pulse signal that is coupled to a source of an output transistor, receiving a first clock signal that is coupled to the source of the output transistor, and receiving a second clock signal that is coupled to the source of a bias transistor. The second clock signal is 180 degrees out of phase with respect to the first clock signal. The method further includes charging a capacitor to a predetermined level to inhibit at least one parasitic effect. One plate of the capacitor is connected to a well-bias of the output transistor and the other plate is connected to ground. The method further includes outputting the full range of the high voltage pulse signals at the drain of the output transistor.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

Figure 1:
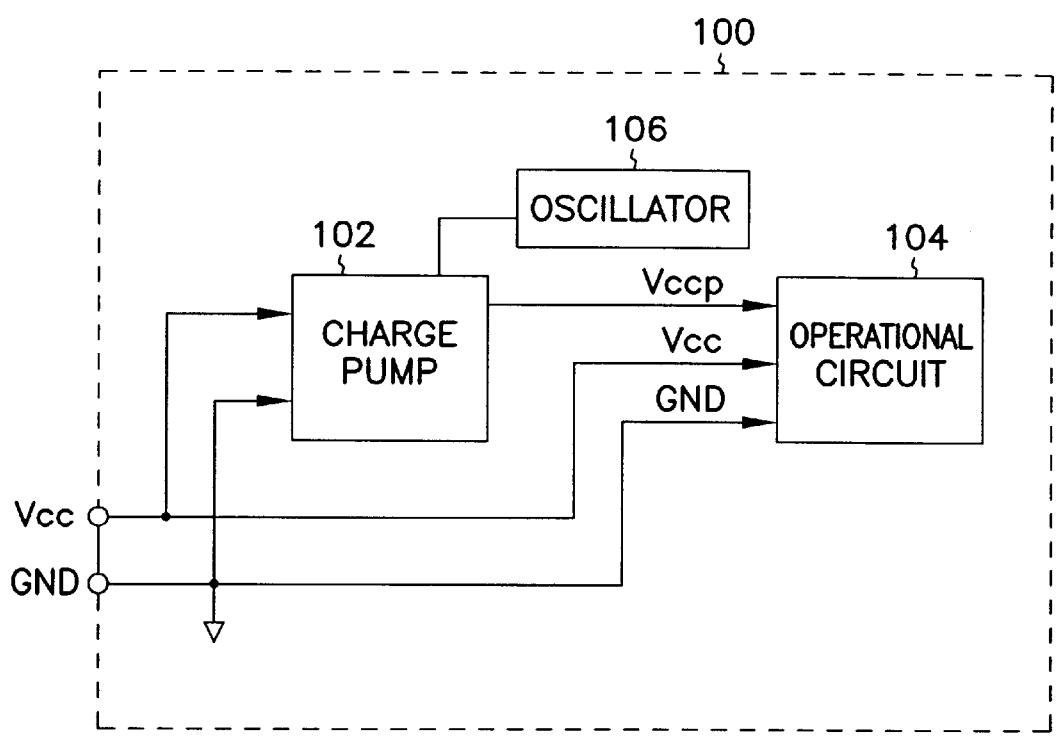
FIG. 1 is a block diagram of a device according to an embodiment of the present invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The transistors described herein include transistors from bipolar-junction technology (BJT), field-effect technology (FET), or complementary metal-oxide-semiconductor (CMOS). A metal-oxide-semiconductor (MOS) transistor includes a gate, a first node (drain) and a second node (source). Since a MOS is typically a symmetrical device, the true designation of "source" and "drain" is only possible once a voltage is impressed on the terminals. The designations of source and drain herein should be interpreted, therefore, in the broadest sense.

The capacitor described herein can be any capacitor fabricated on an integrated circuit using any fabrication technique. The capacitors described herein, however, may be fabricated as n-channel transistors having their source and drain electrically connected.

The terms "high" and "low" as used herein to refer to Vcc (supply voltage) and ground, respectively.

One of the limiting factors that affect the performance of the charge pump circuit is the output stage. To achieve high output voltage efficiently, the output stage must be able to pass the high voltage generated by the previous stages to the output node. A conventional charge pump circuit using n-channel metal-oxide-semiconductor (NMOS) transistors suffers from a threshold voltage drop through the stages. The performance of the pump is made even worse by the output stage since the threshold voltage of the last stage is much higher due to high substrate bias.

One way to deal with this problem is to eliminate the threshold voltage drop at the output stage. This is accomplished by using boosted clock signals on a gate of the output transistor. As long as the amplitude of the boosted clock signals is higher than the supply voltage of the charge pump circuit plus the threshold voltage, the high voltages of the stages can be passed through at the output stage without degradation.

The problem with this approach is that it adds complexity to the charge pump circuit. The following embodiments illustrate other ways of dealing with the problem at the output stage of a charge pump circuit according to the present invention.

FIG. 1 is a block diagram of a device according to an embodiment of the present invention. The device 100 has a charge pump 102, an oscillator 106, and operational circuit 104. The operational circuit 104 can be any functional circuit; for example, a memory device such as a dynamic random access memory (DRAM) or flash device. The charge pump 102 converts Vcc provided by an external power supply into a higher potential Vccp. The operational circuit 104, therefore, has both Vcc and Vccp available.

Figure 2:
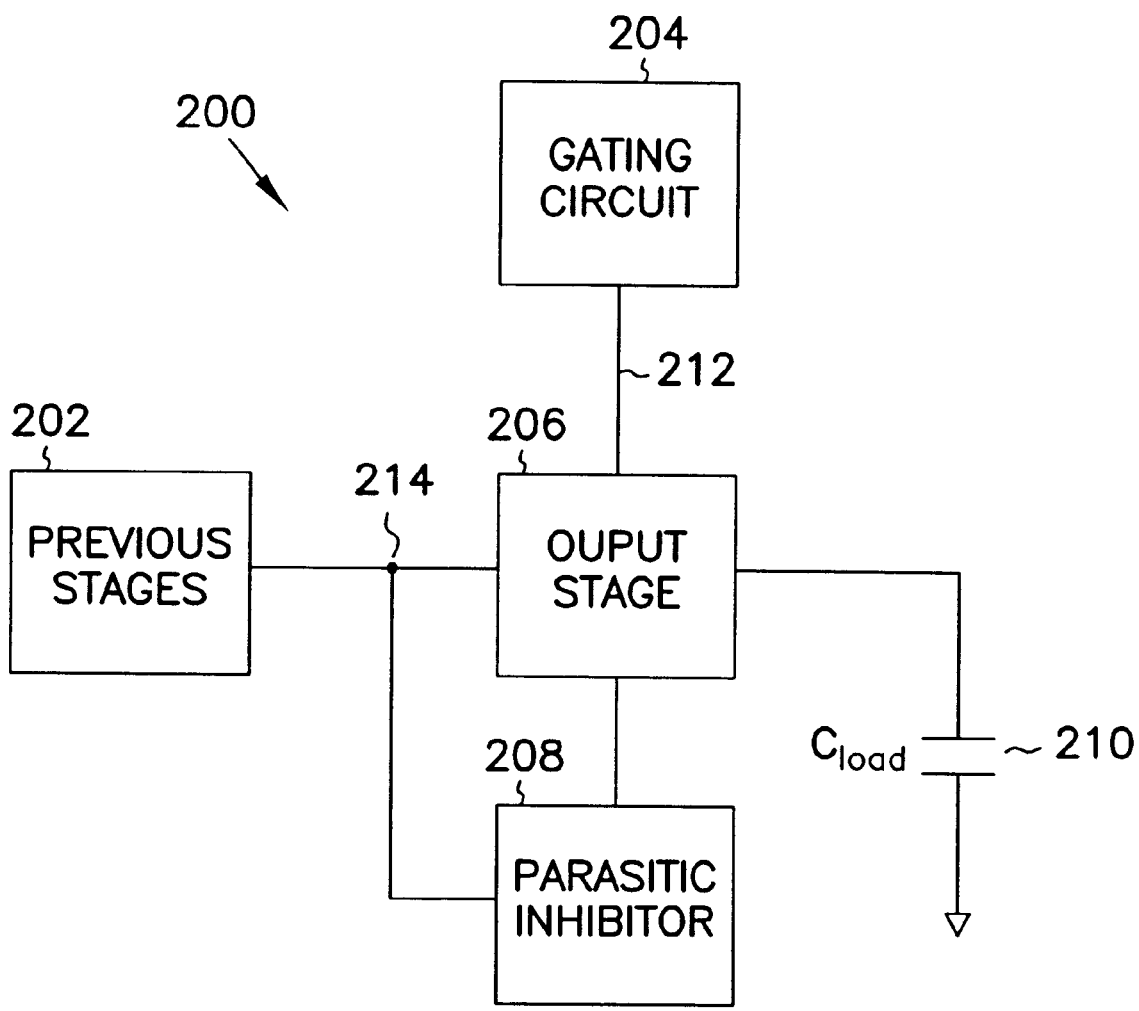
FIG. 2 is a block diagram illustrating a charge pump circuit according to one embodiment of the present invention.

FIG. 2 is a block diagram illustrating a charge pump circuit according to one embodiment of the present invention. Charge pump circuit 200 includes previous stages 202. These previous stages condition and generate a voltage signal 214 more positive than the most positive external supply or more negative than the most negative external supply. After such conditioning, the previous stages deliver the voltage signal 214 to the output stage 206.

The output stage 206 receives the voltage signal 214 and prepares to transfer the voltage signal 214 to a load 210. For illustrative purposes, the load 210 is represented by a capacitor $C_{load}$ although the load 210 may be represented by a linear element or both non-linear and linear elements.

The gating circuit 204 controls the output stage 206. The gating circuit 204 is designed to allow a full range of the voltage signal 214 to be received by the output stage 206. In one embodiment, the gating circuit 204 independently generates a gating signal 212. In another embodiment, the gating circuit 204 is dependent on previous stages 202 to produce the gating signal 212. In all embodiments, this gating signal 212 turns on the output stage 206 at predetermined time intervals so that the voltage signal 214 can be transferred without level degradation to the load 210. In all embodiments, the gating signal 212 turns off the output stage 206 at another predetermined time interval so that the voltage signal 214 is not transferred to the load 210.

Under certain operating conditions, such as the introduction of a certain level of bias voltages, the output stage 206 suffers from parasitic effects. These effects may cause degradation in the voltage signal transferred to the load 210.

The parasitic effects may generate errant current flow causing either damage to other devices in the vicinity, or changes in the state of the devices, or both.

The parasitic inhibitor 208 maintains the output stage 206 to a certain state to inhibit the parasitic effects. The function of the parasitic inhibitor is explained in detail below. The parasitic inhibitor 208 is coupled to the output stage 206. The parasitic inhibitor 208 is coupled also to the voltage signal 214.

Figure 3:
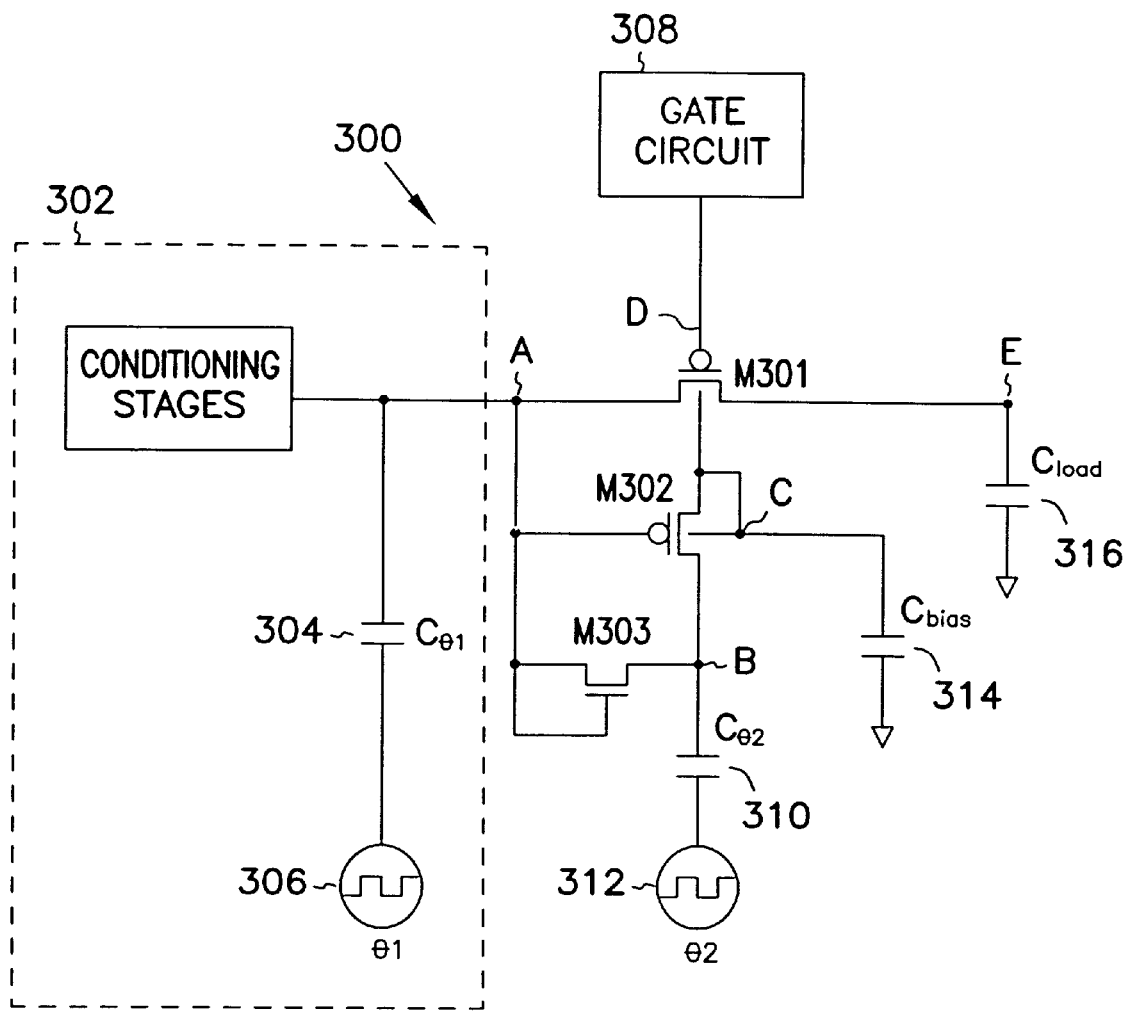
FIG. 3 is a circuit diagram according to one embodiment of the present invention.

FIG. 3 is a circuit diagram according to one embodiment of the present invention. Circuit 300 includes previous pump stages 302 to pump and generate a high voltage signal more positive than the most positive external supply or more negative than the most negative external supply. The high voltage signal is presented at node A.

In the present embodiment, the circuit described herein illustrates MOS technology that is adapted to receive a high voltage signal more positive than the most positive external supply. However, such illustration is not limiting since one with ordinary skills in the art would know how to carry out the concept disclosed herein by using a high voltage signal more negative than the most negative external supply to other technologies, such as BJT and FET.

Returning to FIG. 3, a clock 306 generates a train of clock signals. In FIG. 3, this clock is represented symbolically by $\theta_1$. This train of clock signals passes through a bypass capacitor 304. In FIG. 3, this bypass capacitor 304 is represented symbolically by $C_{\theta 1}$. The bypass capacitor 304 inhibits the DC component of the train of clock signals from entering other components of the circuit 300. The train of clock signals provided by clock 306 is presented at node A.

The gating circuit 308 provides a gating signal at node D. The gating signal is 180 degrees out of phase with respect to the train of clock signals provided by clock 306. When the voltage level of the clock signal provided by clock 306 is high, the gating signal of the gating circuit 308 should be low enough so that the transistor M301 is turned on. In one embodiment, the transistor M301 is a p-channel metal-oxide-semiconductor (PMOS) transistor. In another embodiment, the transistor M301 is formed from bipolar-junction technology. In yet another embodiment, the transistor M301 is formed from complementary metal-oxide-semiconductor (CMOS) technology. In a further embodiment, mixed transistor technology is used to form the transistor M301.

Once the transistor M301 is turned on, the voltage presented at node A is transferred to node E. When the voltage level of the clock signal provided by clock 306 is low, the gating signal of the gating circuit 308 should be high enough so that the transistor M301 is turned off. Once the transistor M301 is turned off, the voltage presented at node A is inhibited from being transferred to node E. The transistor M301 is coupled to the gate circuit 308 through the gate at node D. The transistor M301 is connected to node A through its source. The transistor M301 is connected to node E through its drain.

The voltage at node E is presented across the output load 316. For illustrative purposes, the output load 316 is represented by a capacitor $C_{load}$. However, the output load 316 could be represented as a linear device or a combination of both a linear and non-linear device.

The charging transistor M302 is a p-channel transistor and is coupled to node A through its gate. The charging transistor M302 is connected to node C through its drain. The source of the transistor M302 is connected to node B. The well-bias of transistor M302 is connected to node C. Node C is also connected to the well-bias of transistor M301. Therefore, the well-bias of the transistor M301, the drain of the transistor M302, and the well-bias of the transistor M302 are connected together through node C. Also connected to node C is a biasing capacitor 314. The biasing capacitor 314 is represented by $C_{bias}$.

Transistor M303 is an n-channel transistor. The gate of the transistor M303 is connected to the drain of the transistor M303. The drain of the transistor M303 is connected to the node A. Therefore, the gate and the drain of the transistor M303 are connected to the node A. The source of the transistor M303 is connected to the node B.

Also connected to the node B is one of the plates of a bypass capacitor 310. The bypass capacitor 310 is represented by $C_{\theta 2}$. The other plate of the bypass capacitor 310 is connected to a clock 312. The clock 312 is represented by θ₂. The clock 312 provides a train of clock signals to the bypass capacitor 310. The bypass capacitor 310 allows the alternating component of the train of clock signals of clock 312 to pass through to node B. The clock 312 is out of phase with respect to clock 306 by 180 degrees.

Having described the relationship between the components of the circuit 300, its operation is now discussed. The previous pump stages 302 pump and generate a high voltage signal. This voltage signal is presented at node A. Also presented at node A is the train of clock signals from clock 306.

The gating signal provided by the gate circuit 308 at node D is out of phase with respect to the train of clock signals of clock 306 by about 180 degrees. Whenever the clock signal of clock 306 is high, the gate signal at node D is low. The low gate signal turns on the transistor M301. When the transistor M301 is turned on, it transfers the voltage signal at node A to node E. The voltage signal at node E is made available to the output load 316. Whenever the clock signal of clock 306 is low, the gate signal at node D is high. The high gate signal turns off the transistor M301. When the transistor M301 is turned off, the voltage signal at node A is inhibited from being transferred to node E.

Transistor M301 may exhibit certain parasitic effects associated with the structure of the semiconductor. These parasitic effects may be inhibited by biasing the well of transistor M301. In another embodiment, these parasitic effects may be inhibited by biasing the well of both the transistor M301 and M302. The following operation of the circuit 300 discusses the biasing technique.

When the signal level of clock 306 is high at node A, transistor M303 turns on. The transistor M303 is configured to work by connecting both the gate and the drain together. In another embodiment, a square-law device is used instead of the transistor M303. It is understood that a square-law device includes the current-voltage characteristics of a diode. In another embodiment, a diode is used instead of the transistor M303.

When transistor M303 is turned on, a voltage $V_{ds}$ appears across the drain and the source of transistor M303. This voltage $V_{ds}$ is equivalent to the voltage $V_{gs}$ since both the gate and the drain are connected together. Both voltage $V_{ds}$ and $V_{gs}$ are equivalent to the threshold voltage of transistor M303, $V_{t303}$. This is the case because in order for the transistor M303 to turn on, a voltage greater than the threshold voltage $V_{t303}$ must appear between node A and node B.

In an initial condition, the signal level of clock 312 is low while the signal level of clock 306 is high. There are no charges yet being stored at capacitor 310. Thus, the voltage level at node B is the voltage level at node A minus the threshold voltage $V_{t303}$ to turn on transistor M303. Once transistor M303 is turned on, the charges at node A travel across the drain and source of transistor M303 to reach node B and charge up the capacitor 310. The capacitor 310 will be charged up to the voltage level at node B, which is equivalent to the voltage level at node A minus the threshold voltage $V_{t303}$.

When the signal level of clock 306 is high at node A, the transistor M302 is turned off because the voltage level at node B is less than A. There is not a sufficient voltage level to provide the minimum threshold voltage $V_{t302}$ between the gate and the source to turn on the transistor M302.

In the initial condition, if the transistor M302 is off, no voltage appears across the drain of the transistor M302 and the source of the transistor M302. In other words, no voltage appears across at the node C since the node C is connected to the drain of the transistor M302. After the initial condition, even if the transistor M302 is off, the node C will have a certain voltage level that is present because of the charges stored in the capacitor 314. The appearance of these charges stored in the capacitor 314 is explained below.

When the signal level of clock 306 is low, the transistor M302 turns on. The transistor M302 turns on because the voltage at the source of the transistor M302 is higher than the voltage at the gate of the transistor M302. The voltage at the source of the transistor M302 or node B is the sum of the voltage across the capacitor 310 and the additional voltage level provided by the voltage signal from clock 312. The clock 312, as described above, has an opposing phase to clock 306. Thus, when the signal from clock 306 is low, the signal from clock 312 is high.

Since the transistor M302 is turned on, the charges at the source (node B) of the transistor M302 travel to the drain (node C) of the transistor M302. This movement of charges in a semiconductor would be understood by one with ordinary skills in the art. The charges at the drain (node C) of the transistor M302 move to the capacitor 314 where they are stored. As more charges arrive at the capacitor 314, the voltage across the capacitor 314 or node C is increased. When the transistor M302 is turned on, the voltage level of node C follows the voltage level of node B. In one embodiment, in order to allow node C to quickly follow node B, appropriate sizes of transistor M302 and the capacitor 314 are chosen.

In one embodiment, the configuration of the transistor M303 prevents charges from node B from traveling to node A to charge capacitor 304. In one configuration, the voltage at node B is greater than the voltage at node A. Hence, the voltage at the source of the transistor M303 is greater than the voltage at the gate of the transistor M303. This prevents any appreciable current to flow from node B to node A. Therefore, the majority of charges flow from node B to node C instead.

When the voltage at node C increases to a certain level, it biases the well of the transistors M302 and M303. By biasing the well, it is understood to mean that a voltage level is imposed over the well of the transistors M302 and M303. Such a biasing suppresses the parasitic effects inherent in the transistors M302 and M303. Further discussion of the parasitic effects will be presented below.

In one embodiment, when the signal of clock 306 is again high, the transistor M302 is turned off because the voltage at node A is higher than node B. No charges can flow from node B to node C because the transistor is turned off. However, the capacitor 314 contains enough charges during the time that the signal of clock 306 is high to maintain a voltage level that biases the well of both transistors M301 and M302 to inhibit parasitic effects. When the signal of clock 306 is again low and the signal of clock 312 is high, the capacitor 314 is again recharged by charges flowing from node B to node C.

In another embodiment, when the signal of clock 306 is again high, the transistor M302 continues to be on because the voltage at node A is lower than node C even though the signal of clock 306 is high. However, because the voltage at node B is lower than node A and thus lower than node C, charges flow from node C to node B. As charges flow from node C to node B, the voltage of node C will decrease. If the duration of the signal of clock 306 is long enough, the voltage of node C will continue to decrease until M302 is turned off. In one embodiment, the circuit is designed so that when the transistor M302 is turned off the voltage of node C is still higher than the voltage at node A plus the threshold voltage $V_{302}$ of the transistor M302. In all embodiments, the voltage of node C is maintained so that the well of either or both transistors M302 and M301 continues to be biased to inhibit the parasitic effects.

Figure 4:
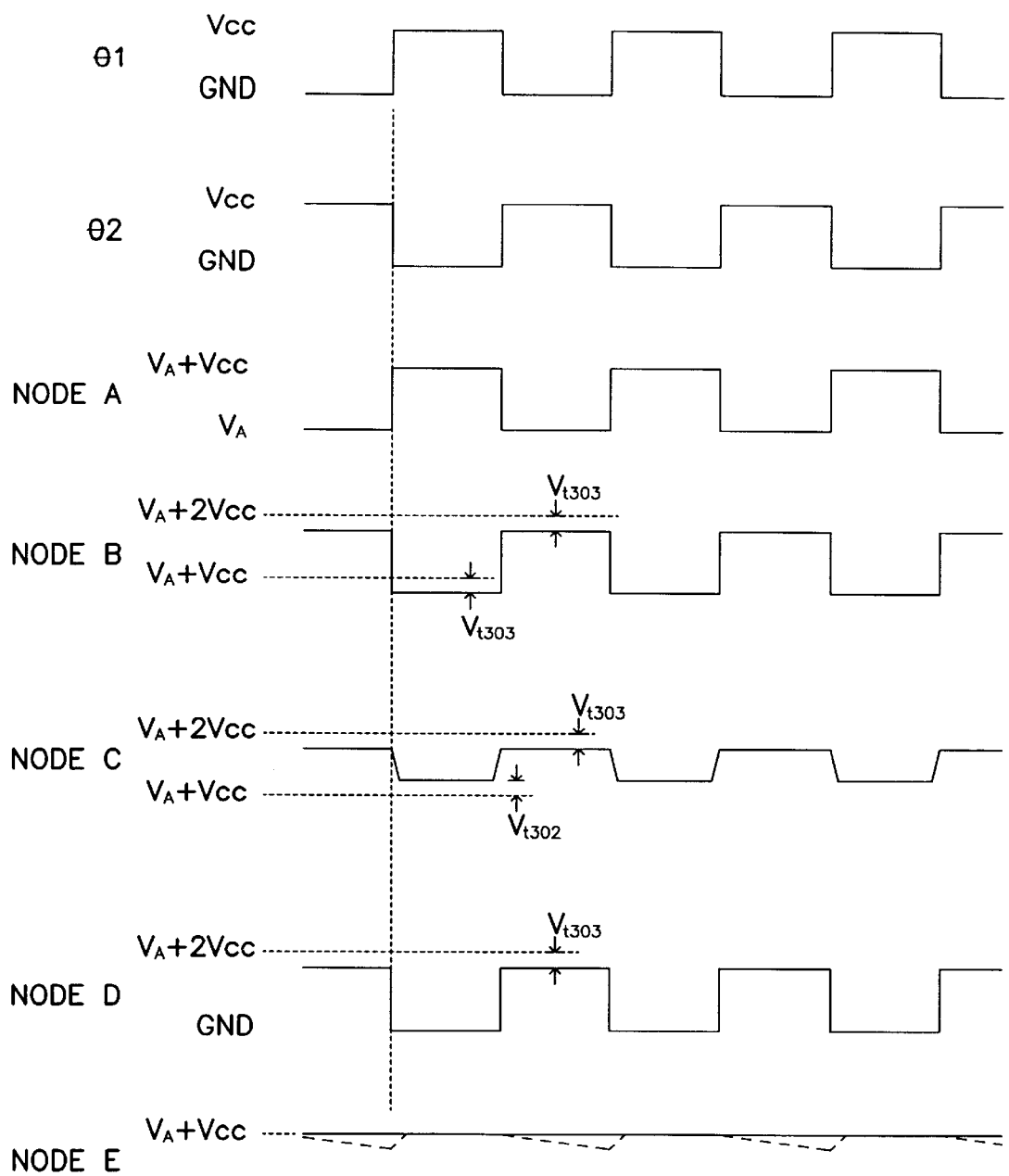
FIG. 4 is a timing diagram for the circuit as illustrated by FIG. 3 according to one embodiment of the present invention.

FIG. 4 is a timing diagram according to one embodiment of the present invention. FIG. 4 shows the timing waveforms when the output of the circuit at node E of FIG. 3 has reached a desired level (stable condition). The signal of $\theta_1$ shows the train of clock signals that is provided by clock 306 of FIG. 3. The signal of $\theta_2$ shows the train of clock signals that is provided by clock 312 of FIG. 3. The signal of $\theta_2$ is out of phase with respect to the signal of $\theta_1$ by 180 degrees. The signal of node A is shown to follow the signal of $\theta_1$. The signal at node A transitions between the level of Vcc plus the voltage $V_A$ at node A and the level of the voltage $V_A$. The signal of node B is shown to follow the phase of the signal $\theta_2$. The signal at node B is shown to transition between the level of twice the amount of supply voltage Vcc plus the voltage $V_A$ and minus the voltage $V_{t303}$, and the level of Vcc plus the voltage voltage $V_A$ and minus the threshold voltage $V_{t303}$. The signal at node C is shown to follow the signal at node B. The signal at node C transitions between the level of twice the amount of supply voltage Vcc Plus $V_A$ and minus the threshold voltage $V_{t303}$, and the level of Vcc plus $V_A$ and $V_{t302}$. The signal at node D follows the signal $\theta_2$. The signal at node D transitions between the level of twice the amount of supply voltage Vcc plus $V_A$ and minus $V_{t303}$ and the level at ground. The signal at node E is fairly constant unless there is leakage or load current at node E. The signal at node E is maintained at Vcc plus $V_A$. If there is leakage or load current, the voltage at node E is slightly decreased when M301 is turned off, in one embodiment.

Figure 5:
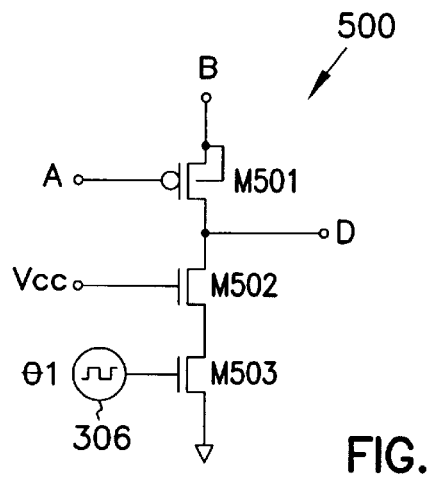
FIG. 5 is a circuit diagram according to one embodiment of the present invention.

FIG. 5 is a circuit diagram according to one embodiment of the present invention. Circuit 500 is one embodiment of a gating circuit 308 as shown in FIG. 3. The well of the PMOS transistor M501 is biased by node B so that the effects of parasitic elements are inhibited.

When the voltage level at the node A is sufficiently low, the transistor M501 turns on. The transistor M502 is always on because of the positive supply voltage at the gate of the transistor M502. Since the signal $\theta_1$ is low when the node A is low, the transistor M503 is turned off. Because the transistor M503 is turned off, the voltage at the node D is not defined by the transistor M502 and M503, but instead, node D rises to the voltage level at the node B.

When the voltage at the node A is high, the transistor M501 turns off. Again, the transistor M502 is always on. Since the signal $\theta_1$ is high when the node A is high, the transistor M503 is turned on. The voltage level at the node D no longer rises to the voltage level at the node B even though the node B continues to bias the well of the transistor M501. The voltage at the node D is now defined by the two $V_{ds}$ voltages of the transistor M502 and M503. Since the two $V_{ds}$ voltages do not exhibit any potential difference, node D will be pulled to ground.

Figure 6:
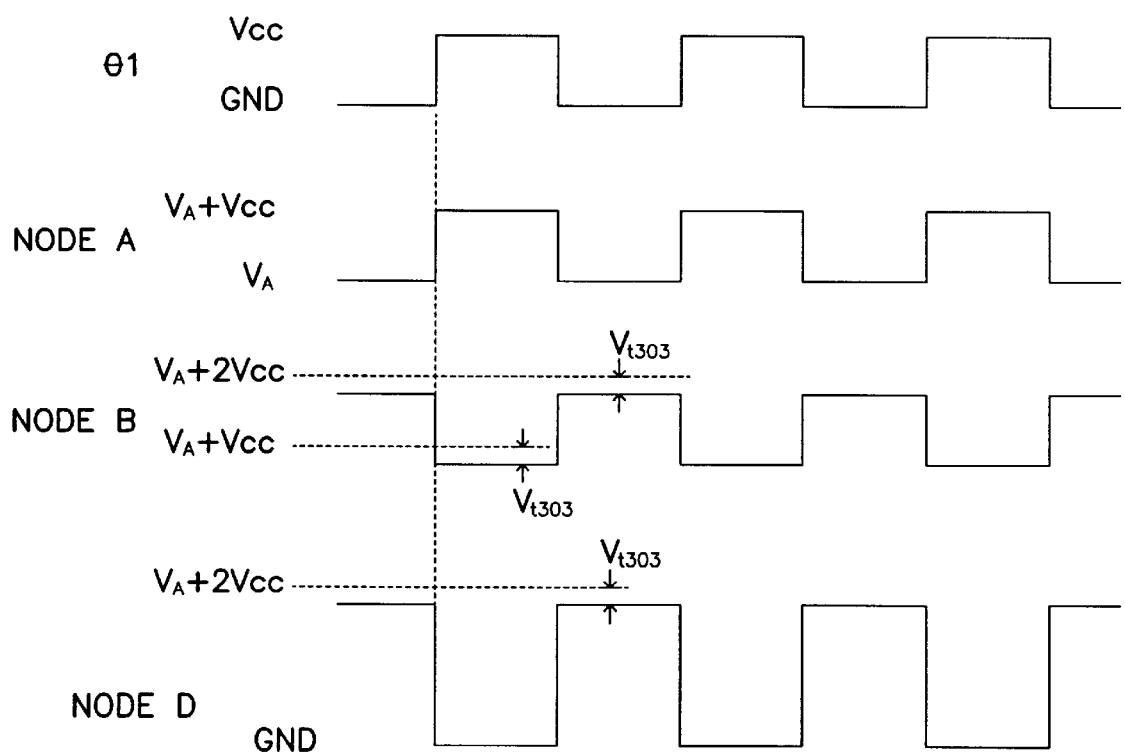
FIG. 6 is a timing diagram for the circuit as illustrated by FIG. 5 according to one embodiment of the present invention.

FIG. 6 is a timing diagram for the circuit as illustrated in FIG. 5 according to one embodiment of the present invention. The signal $\theta_1$ is the train of clock signals that is provided by clock 306 of FIG. 5. The signal of node A has the same phase as the signal of $\theta_1$. The signal of node B is out of phase with respect to the signal of node A. The signal of node D rises to the voltage level of the signal of node B when the signal of node A is low.

Figure 7:
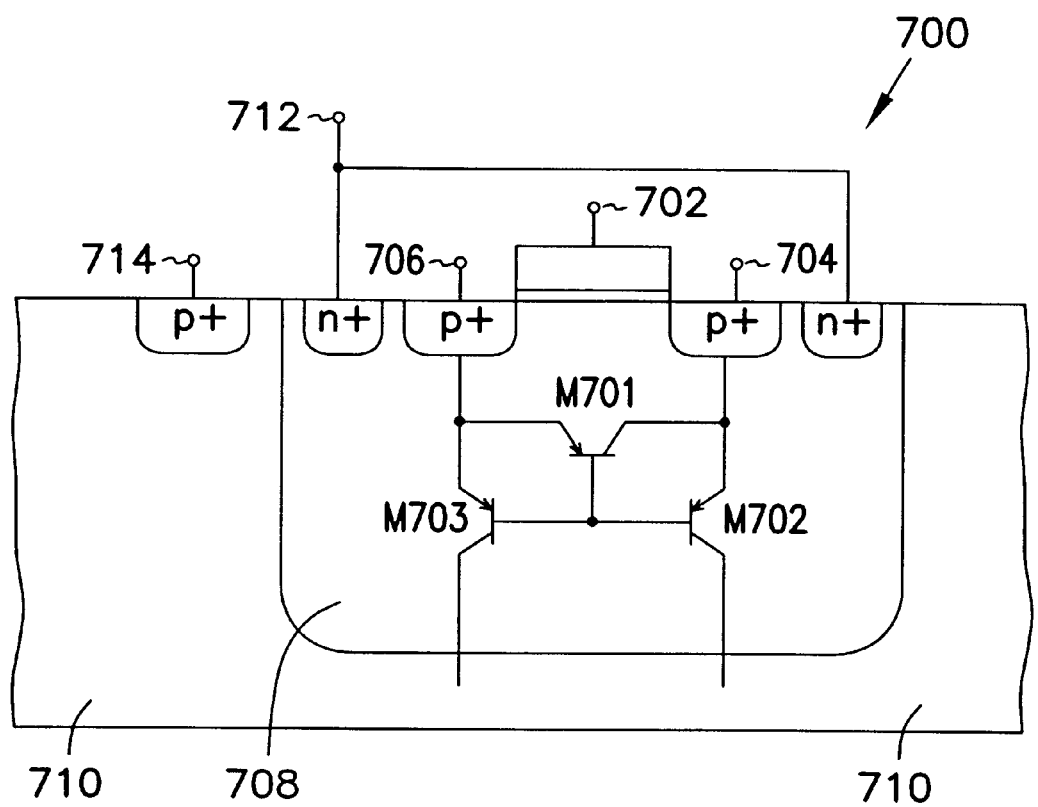
FIG. 7 is a semiconductor structural diagram illustrated with parasitic elements according to one embodiment of the present invention.

FIG. 7 is a semiconductor structural diagram illustrated with parasitic transistors according to one embodiment of the present invention. A p-channel transistor 700 has a gate connection 702. The transistor 700 also has a drain connection 704 and a source connection 706. Both the drain connection 704 and the source connection 706 contain a layer of p-type semiconductor.

These two layers of p-type semiconductor are situated in an n-well 708. It is understood, from the science of semiconductor physics, that the n-well allows a depletion region and a channel to be formed between the drain connection 704 and the source connection 706 when a voltage level is applied at the gate connection 702. The depletion region and the channel must be formed in order for controllable charges to flow in the transistor 700.

The n-well 708 is surrounded within a p-type substrate 710. The n-well 708 has an electrical contact 712. This electrical contact 712 allows the n-well 708 to be biased. As will be discussed below, the biasing of the n-well prevents parasitic effects.

The p-type substrate 710 has an electrical contact 714. This electrical contact 714 allows the p-type substrate 710 to be biased. As will be discussed below, the biasing of the substrate inhibits the possibility of latch-up problems in semiconductor circuits.

During the operation of the transistor 700, the voltage level of the n-well may be less than the voltage level of the source connection 706 or the drain connection 704. When that situation arises, parasitic transistors become active in the transistor 700.

A parasitic bipolar-junction transistor M701 is formed. The emitter of the transistor M701 is formed from the p-type layer of the source connection 706 of the transistor 700. The base of the transistor M701 is formed from the n-well 708. The collector of the transistor M701 is formed from the p-type layer of the drain connection 704 of the transistor 700. Hence, the formed transistor M701 is a PNP bipolar-junction transistor.

Another parasitic bipolar-junction transistor M702 is formed. The emitter of the transistor M702 is formed from the p-type layer of the drain connection 704 of the transistor 700. The base of the transistor M702 is formed from the n-well 708. The collector of the transistor M702 is formed from the p-type substrate 710 of the transistor 700. Hence, the formed transistor M702 is a PNP bipolar-junction transistor.

Yet another parasitic bipolar-junction transistor M703 is formed. The emitter of the transistor M703 is formed from the p-type layer of the source connection 706 of the transistor 700. The base of the transistor M703 is formed from the n-well 708. The collector of the transistor M703 is formed from the p-type substrate 710 of the transistor 700. Hence, the formed transistor M703 is a PNP bipolar-junction transistor.

Together, these three PNP bipolar-junction transistors M701, M702, and M703 represent the parasitic effects in the p-channel transistor 700. The base of these transistors is connected to the electrical contact 712. If the voltage level at the electrical contact 712 is lower than the voltage level at the source connection 706 or the drain connection 704, the base of these transistors is also low with respect to the source connection 706 or the drain connection 704.

When the voltage level at the base of transistors M701, M702, and M703 is low enough, all of these transistors are turned on. This is the case because PNP transistors unlike NPN transistors require a certain level of negative $V_{be}$ voltage to turn on. These transistors will then divert some of the charges flowing from the source connection 706 to the drain connection 704. The diverted charges might enter the substrate 710. If the electrical contact at 714 is not negative enough to attract these diverted charges, these flowing charges may cause potential changes in the substrate. The potential change of the substrate, if great enough, may contribute to a latch-up problem that may damage other transistors in the vicinity of the transistor 700.

To inhibit the parasitic effects that arise from transistors M701, M702, and M703, the base of these transistors must be kept at a high voltage level. A high voltage level would reverse-bias these transistors to turn them off. Thus, a voltage level applied at electrical contact 712 that is higher than the voltage of the source connection 706 and the drain connection 704 will turn off the transistors M701, M702, and M703. As an additional measure, a voltage with the appropriate polarity is applied at the electrical contact 714. Such voltage attracts stray charges injected into the substrate from the transistor 700. Thus, any stray charges will want to exit through electrical contact 714 instead of flowing to other circuits in the vicinity of transistor 700. In one embodiment, a guard ring is provided near the transistor 700 to inhibit latch-up problems. In another embodiment, a guard ring is provided with other transistors near the vicinity of transistor 700 to inhibit latch-up problems.

CONCLUSION

Devices and methods have been described to output a high voltage signal in a charge pump circuit. The embodiments as described allow a high voltage signal to be outputted from a charge pump circuit without level degradation. This is accomplished without complicated clocking schemes or boosted clock circuitry. The described embodiments are operable under either high supplied voltage or low supplied voltage. Also, the described embodiments consume lower levels of power.

Although the specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A charge pump circuit, comprising:
   a plurality of boosting stages to boost a voltage signal;
   an output stage coupled to the plurality of boosting stages to output the voltage signal;
   a gating circuit coupled to the output stage to control the output stage; and
   a parasitic inhibitor circuit coupled to the output stage to inhibit at least one parasitic effect in the output stage, the parasitic inhibitor circuit comprising:
   a transistor having a drain, a source, a gate, and a well-bias, the drain coupled to the well-bias, and wherein an output is taken from the drain of the transistor;
   a square-law device having an input and an output, the input of the square-law device coupled to the gate of the transistor, the output of the square-law device coupled to the source of the transistor; and
   a capacitor having a first plate and a second plate, the first plate coupled to the well-bias of the transistor, and the second plate coupled to ground.

2. The charge pump circuit of claim 1, wherein the gating circuit acts upon the output stage so as to allow the voltage signal to be outputted without level degradation.

3. The charge pump circuit of claim 1, wherein the parasitic inhibitor circuit maintains a predetermined energy level in the output stage so as to inhibit at least one parasitic effect.

4. A charge pump circuit, comprising:
   a plurality of boosting stages to boost a voltage signal to provide a boosted voltage signal;
   a p-channel output transistor to output the boosted voltage signal, the output transistor having an input connection, an output connection, a control connection, and a bias connection, the input connection of the p-channel output transistor coupled to the plurality of boosting stages, and wherein the boosted voltage signal is presented at the output connection of the p-channel output transistor;
   a gating circuit coupled to the control connection of the p-channel output transistor to control the p-channel output transistor;
   a parasitic inhibitor circuit coupled to the bias connection of the p-channel output transistor to inhibit at least one parasitic effect in the output transistor the parasitic inhibitor circuit comprising:
   a transistor having a drain, a source, a gate, and a well-bias, the drain coupled to the well-bias;
   a square-law device coupled to the gate of the transistor; and
   a capacitor coupled between the well bias and ground.

5. The charge pump circuit of claim 4, wherein the gating circuit acts upon the control connection of the output transistor so as to allow the boosted voltage signal to be outputted without level degradation.

6. The charge pump circuit of claim 4, wherein the parasitic inhibitor circuit maintains a predetermined energy level in the bias connection of the output transistor so as to inhibit at least one parasitic effect.

7. A charge pump circuit, comprising:
   a plurality of boosting stages to boost a voltage signal to provide a high voltage signal;
   a p-channel transistor to output the high voltage signal, the p-channel transistor having an input connection, an output connection, a control connection, and an n-well bias connection, the input connection of the p-channel transistor coupled to the plurality of boosting stages, and wherein the high voltage signal is presented at the output connection of the p-channel transistor;
   a gating circuit coupled to the control connection of the p-channel transistor to control the p-channel transistor;
   a parasitic inhibitor circuit coupled to the n-well bias connection of the p-channel transistor to inhibit at least one parasitic effect in the p-channel transistor the parasitic inhibitor circuit comprising:
   a transistor having a drain, a source, a gate, and a well-bias, the drain coupled to the well-bias;
   a square-law device coupled to the gate of the transistor; and
   a capacitor coupled between the well bias and ground.

8. The charge pump circuit of claim 7, wherein the gating circuit acts upon the control connection of the p-channel transistor so as to allow the high voltage signal to be outputted without level degradation when the p-channel transistor is turned on.

9. The charge pump circuit of claim 7, wherein the parasitic inhibitor circuit maintains a high energy level in the n-well bias connection of the p-channel transistor so as to inhibit at least one parasitic effect.

10. A charge pump circuit, comprising:
   a plurality of boosting stages to boost a voltage signal to provide a high voltage signal;
   an output stage coupled to the plurality of boosting stages to output the high voltage signal;
   a gating circuit coupled to the output stage to provide a controlling signal to control the output stage, and wherein the gating circuit comprises:
      a first transistor having a drain, a source, a gate, and an n-well bias, the drain of the first transistor coupled to the n-well bias of the first transistor, the gate of the first transistor coupled to a first train of clock signals, the drain of the first transistor coupled to a second train of clock signals having complementary phase with respect to the first train of clock signal;
      a second transistor having a drain, a source, and a gate, the drain of the second transistor coupled to the source of the first transistor, the gate of the second transistor coupled to a supply voltage of the charge pump circuit, and wherein the drain of the second transistor provides the controlling signal to control the output stage of the charge pump circuit; and
      a third transistor having a drain, a source, and a gate, the drain of the third transistor coupled to the source of the second transistor, the gate of the third transistor coupled to a third train of clock signals having the same phase with respect to the first train of clock signals, the source of the third transistor coupled to ground; and
   a parasitic inhibitor circuit coupled to the output stage to inhibit at least one parasitic effect in the output stage.

11. The charge pump circuit of claim 10, wherein the gating circuit acts upon the output stage so as to allow the high voltage signal to be outputted without level degradation.

12. The charge pump circuit of claim 10, wherein the parasitic inhibitor circuit maintains a predetermined energy level in the output stage so as to inhibit at least one parasitic effect.

13. A charge pump circuit, comprising:
   a plurality of boosting stages to boost a voltage signal to provide a high voltage signal;
   an output stage coupled to the plurality of boosting stages to output the high voltage signal;
   a gating circuit coupled to the output stage to control the output stage; and
   a parasitic inhibitor circuit coupled to the output stage and the plurality of boosting stages to inhibit at least one parasitic effect in the output stage, and wherein the parasitic inhibitor circuit comprises:
      a charging transistor having a drain, a source, a gate, and a well-bias, the drain of the charging transistor coupled to the well-bias of the charging transistor, the gate of the transistor coupled to a first train of clock signals, the source of the transistor coupled to a second train of clock signals having a complementary phase with respect to the first train of clock signals;
      a biasing transistor having a drain, a source, and a gate, the drain of the biasing transistor coupled to the gate of the biasing transistor, the gate of the biasing transistor coupled to the gate of the charging transistor, the source of the transistor coupled to the source of the charging transistor; and
      a capacitor having a first plate and a second plate, the first plate coupled to the well-bias of the charging capacitor, the second plate coupled to ground.

14. The charge pump circuit of claim 13, wherein the gating circuit acts upon the output stage so as to allow the high voltage signal to be outputted without level degradation.

15. The charge pump circuit of claim 13, wherein the parasitic inhibitor circuit maintains a predetermined energy level in the output stage so as to inhibit at least one parasitic effect.

16. A charge pump circuit, comprising:
   a p-channel output transistor having a drain, a source, and a gate, wherein the p-channel output transistor is formed in an n-well having an n-well bias, and a bias circuit is connected to the n-well bias to inhibit at least one parasitic effect associated with the output transistor;
   a first clock circuit coupled to the source of the output transistor to provide a first clock output signal;
   a gate controlling circuit coupled to the gate of the output transistor to provide a gate signal, wherein the gate signal is 180 degrees out of phase with respect to the first clock output signal of the first clock circuit;
   wherein the output transistor is turned on to present a full range of the first clock output signal of the first clock circuit at the drain of the output transistor when the gate signal is at a first predetermined level, and wherein the output transistor is turned off to inhibit the first clock output signal from being presented at the drain of the output transistor when the gate signal is at a second predetermined level; and
   wherein the bias circuit further comprises:
      a bias transistor having a drain, a source, a gate, and a well-bias, the drain of the bias transistor coupled to the well-bias of the bias transistor, the gate of the bias transistor coupled to the first clock circuit;
      a second clock circuit coupled to the source of the bias transistor to provide a second clock output signal, and wherein the second clock output signal of the second clock circuit is complementary in phase with respect to the first clock output signal of the first clock circuit;
      a square-law device having an input and an output, the input of the square-law device coupled to the gate of the bias transistor, the output of the square-law device coupled to the source of the bias transistor; and
      a capacitor having a first plate and a second plate, the first plate coupled to the well-bias of the bias transistor, the second plate coupled to ground.

17. The charge pump circuit of claim 16, wherein the bias transistor is a p-channel transistor.

18. The charge pump circuit of claim 17, wherein the square-law device is a diode.

19. The charge pump circuit of claim 18, wherein the square-law device is a complementary metal-oxide-semiconductor transistor having a gate and a drain, the gate of the field-effect transistor being connected to the drain of the complementary metal-oxide-semiconductor transistor.

20. An integrated circuit for inhibiting at least one parasitic effect of a semiconductor transistor, the integrated circuit comprising:
- a transistor having a drain, a source, a gate, and a well-bias, the drain coupled to the well-bias, and wherein an output is taken from the drain of the transistor;
- a square-law device having an input and an output, the input of the square-law device coupled to the gate of the transistor, the output of the square-law device coupled to the source of the transistor; and
- a capacitor having a first plate and a second plate, the first plate coupled to the well-bias of the transistor, and the second plate coupled to ground.

21. The integrated circuit of claim 20, wherein the transistor has a predetermined dimension to supply a desired volume of charges within a predetermined time to the capacitor so as to inhibit at least one parasitic effect.

22. The integrated circuit of claim 20, wherein the square-law device is a diode.

23. A method for transferring power in an output stage of a charge-pump circuit while inhibiting at least one parasitic effect of a semiconductor transistor, the method comprising:
- receiving a high voltage pulse signal, the high voltage pulse signal coupled to a source of an output transistor;
- receiving a first and second clock signals, the first clock signal coupled to the source of the output transistor, the second clock signal coupled to a source of a bias transistor wherein a drain of the bias transistor is coupled to a well-bias of the output transistor, and wherein the second clock signal is 180 degrees out of phase with respect to the first clock signal;
- charging -a capacitor to a predetermined level to inhibit at least one parasitic effect, the capacitor having a first plate connected to the well-bias of the output transistor, the capacitor having a second plate connected to ground; and
- outputting the full range of the high voltage pulse signals at the drain of the output transistor.

24. The method of claim 23, further comprising transferring the high voltage pulse signal from the source of the output transistor to the drain of the output transistor without threshold voltage level degradation.

* * * * *